United States Patent [19]

Hoadley

[11] Patent Number: 4,521,840
[45] Date of Patent: Jun. 4, 1985

[54] D-C BUS CURRENT MONITORING SYSTEM
[75] Inventor: Frederick L. Hoadley, Ithaca, N.Y.
[73] Assignee: Borg-Warner Corporation, Chicago, Ill.
[21] Appl. No.: 466,267
[22] Filed: Feb. 14, 1983
[51] Int. Cl.³ .............................................. H02J 3/36
[52] U.S. Cl. ...................................... 363/35; 363/37; 363/51
[58] Field of Search ...................... 363/34, 35, 37, 38, 363/78, 79, 84, 85, 89, 51

[56] References Cited

U.S. PATENT DOCUMENTS

| | | | |
|---|---|---|---|
| 2,866,148 | 12/1958 | Forssell | 321/2 |
| 3,229,184 | 1/1966 | Churchill | 321/10 |
| 3,431,482 | 3/1969 | Uhlmann | 321/2 |
| 3,453,526 | 7/1969 | Bowles | 321/19 |
| 3,597,674 | 8/1971 | Abbey | 363/89 |
| 3,614,532 | 10/1971 | Smith | 317/16 |
| 3,942,090 | 3/1976 | Matthes et al. | 363/37 |
| 3,944,919 | 3/1976 | Jewell et al. | 324/107 |
| 3,949,291 | 4/1976 | Kanngiesser et al. | 323/105 |
| 4,099,807 | 7/1978 | Barnes | 315/127 |
| 4,177,508 | 12/1979 | Schmid | 363/37 |
| 4,264,951 | 4/1981 | Konishi et al. | 363/35 |
| 4,326,245 | 4/1982 | Saleh | 363/79 |
| 4,328,454 | 4/1982 | Okuyama et al. | 363/37 |
| 4,331,994 | 4/1982 | Wirth | 363/34 |

FOREIGN PATENT DOCUMENTS

| | | | |
|---|---|---|---|
| 57-31376 | 2/1982 | Japan | 363/37 |
| 826496 | 4/1981 | U.S.S.R. | 363/35 |

Primary Examiner—Peter S. Wong
Assistant Examiner—Judson H. Jones
Attorney, Agent, or Firm—James E. Tracy

[57] ABSTRACT

The d-c bus current, fed to an inverter through a low pass filter, having a shunt-connected capacitor, from the output of an a-c energized a-c to d-c converter (such as a phase-controlled SCR rectifier bridge), is monitored by using a-c current transformers to sense the filter capacitor current and the a-c current supplied to the converter. The transformer output signals are employed to produce a d-c signal which is a reduced amplitude replica of, and has the identical waveshape as, the d-c bus current. The monitoring system is electrically isolated from the power circuitry by means of the a-c current transformers.

11 Claims, 1 Drawing Figure

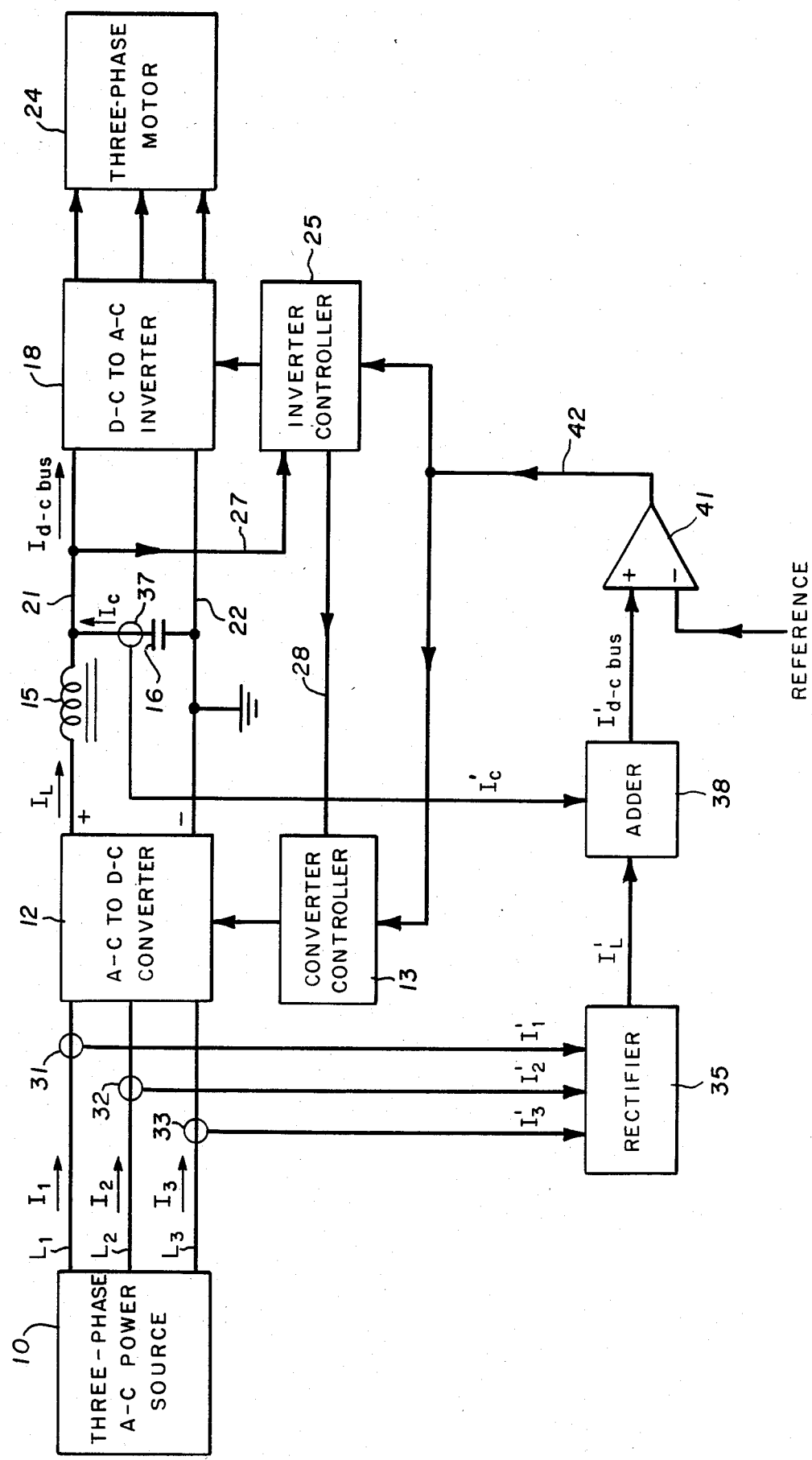

4,521,840

D-C BUS CURRENT MONITORING SYSTEM

BACKGROUND OF THE INVENTION

This invention relates to a monitoring system for sensing the d-c bus current translated from the output of an a-c to d-c converter and through a low pass filter to a voltage source inverter.

D-C bus current monitoring is employed in an inverter system for a variety of different purposes. For example, the sensed bus current may be compared with a set point current, representing a desired bus current level, to provide a control or error signal which effects automatic regulation of the bus current to maintain it at the desired level. Measuring the bus current is also useful to detect fault conditions, such as a shoot-through fault in the inverter or a short circuit in the load driven by the inverter. When a fault occurs, causing the sensed bus current to abruptly increase above a preset maximum allowable level, both the converter and inverter may be shut down to avoid damage to the inverter or to the load. As still another example, bus current monitoring is useful in power factor control.

Sensing of the d-c bus current is usually achieved by means of a d-c current transformer in the d-c bus. In some prior systems, a current shunt is added to the d-c bus. In any event, these prior bus current monitors are relatively complex and expensive, particularly when it is desirable to electrically isolate the sensing circuitry from the power circuitry. In sharp contrast, the d-c bus current monitoring system of the present invention is isolated from the power circuitry and yet it is of extremely simple construction and is very inexpensive compared to the previous monitors.

SUMMARY OF THE INVENTION

The monitoring system of the present invention monitors the d-c bus current supplied over a d-c bus to an inverter and received through a low pass filter, having a series-connected filter choke and a shunt-connected filter capacitor, from the output of an a-c to d-c converter, to the input of which converter is applied a-c energy. The monitoring system comprises input current sensing means, including at least one a-c current transformer and a rectifier, for sensing the a-c input current to the converter and deriving a d-c signal which is proportional to the d-c current produced at the output of the converter. Capacitor current sensing means, including an a-c current transformer, is provided for sensing the filter capacitor current to derive an a-c signal proportional thereto. The two derived signals are added by an adding means to produce a d-c signal which is directly proportional to, and very accurately represents, the d-c bus current.

In short, d-c bus current monitoring is accomplished by using relatively inexpensive a-c current transformers. At the same time, those transformers serve to electrically isolate or insulate the monitoring circuitry from the power circuitry.

DESCRIPTION OF THE DRAWING

The features of the invention which are believed to be novel are set forth with particularity in the appended claims. The invention may best be understood, however, by reference to the following description in conjunction with the accompanying drawing which schematically illustrates a monitoring system, constructed in accordance with one embodiment of the present invention, and the manner in which that monitoring system is coupled to an inverter system to sense the d-c bus current.

DESCRIPTION OF THE ILLUSTRATED EMBODIMENT

Referring to the drawing, line conductors $L_1$, $L_2$ and $L_3$ connect to a conventional three-phase A-C power source 10 which may be the usual A-C power mains, and thus provide three-phase a-c voltage, namely, three alternating voltages varying in sinusoidal fashion and having the same amplitude and frequency but being phase-displaced with respect to each other by 120°. The frequency of the a-c power line voltages will usually be either 50 or 60 cycles per second or hertz, and the magnitude of those voltages may take any appropriate value depending on the characteristics of the load to be driven. As will be made apparent, power source 10 need not be three-phase. It can be any multi-phase power supply, or even a single phase source.

The a-c energy received over the line conductors from source 10 is converted to d-c power by a-c to d-c converter 12, which may take any of a variety of different forms in order to develop a d-c voltage at its output. For example, converter 12 may merely constitute a fixed rectifier for rectifying the line voltages to produce a fixed amplitude d-c voltage. Preferably, however, and it will be assumed that, converter 12 comprises a conventional phase-controlled SCR rectifier bridge so that an adjustable amplitude d-c voltage may be developed. Such a controlled rectifier bridge usually has a family of six SCR's (or silicon controlled rectifiers) arranged in three pairs, to each of which pairs is applied a respective one of the three alternating phase or line voltages provided by three-phase A-C power source 10. In well-known manner, the firing angles of the six SCR's are controlled, by gating signals from controller 13, in order to establish at the output terminals of converter 12 a rectified voltage of a desired magnitude and in order to control the power supplied from source 10 and through the converter.

A low pass filter, comprising series-connected filter choke 15 and shunt-connected filter capacitor 16, filters and smoothes the rectified voltage at the output of converter 12 to develop a filtered d-c voltage for application to d-c to a-c inverter 18 (which constitutes a voltage source inverter) over the d-c bus provided by lines 21 and 22. A positive-polarity d-c bus voltage will appear on line 21 with respect to line 22 which is connected to a ground plane of reference potential or circuit common, zero volts in the illustrated embodiment.

By controlling the firing angles of the six SCR's in converter 12 the d-c bus voltage applied to voltage source inverter 18, via bus 21, 22, is controlled. It will be recognized that the controlled d-c voltage source, provided by converter 12 and filter 15, 16, may operate in response to single-phase rather than three-phase a-c energy. In the single-phase environment, line conductor $L_3$ and a pair of SCR's in the converter would be omitted. Of course, the four remaining SCR's in converter 12 would still provide a d-c bus voltage across the d-c bus 21, 22. If power source 10 provides more than three phases, the construction of converter 12 would be modified in well-known manner to accommodate all of the phase voltages.

Inverter 18 may be constructed in a variety of different ways in order to convert the applied d-c bus voltage to three-phase alternating voltage for application to three-phase a-c motor 24. For example, inverter 18 may be of the three-phase bridge type having six solid state switching devices, such as SCR's or transistors, arranged in three phases or legs, each leg having a pair of switching devices series-connected across the d-c bus 21, 22. The circuit junctions, between the pairs of switching devices, connect to the three windings of three-phase motor 24, whose output shaft (not shown) drives some mechanical load.

By supplying triggering pulses to the inverter switching devices to switch those devices on and off in the correct sequence and at the correct times, the d-c bus voltage is effectively changed to a-c voltage as applied to the windings of motor 24, thereby delivering alternating current to the windings to effect rotation of the motor at a speed determined by and directly proportional to the frequency of the inverter output a-c voltage. Control circuitry (shown in the drawing by the block 25) for applying the required triggering pulses to the switching devices to develop the necessary three-phase a-c energy for rotating motor 24 is well-known to those skilled in the art. Under the control of inverter controller 25, appropriately programmed triggering pulses are supplied to the switching devices of inverter 18, as a result of which the inverter applies a-c voltage to motor 24 of a magnitude directly proportional to the amplitude of the d-c bus voltage. The frequency of the inverter output voltage is established by the frequency of the triggering signals applied to the inverter switching devices from controller 25. In well-known fashion, this frequency may be correlated with and determined by the d-c bus voltage by means of an oscillator, included in controller 25, which operates under the control of and in response to the d-c bus voltage received over line 27. The frequency of the oscillator is determined by the d-c bus voltage and varies directly therewith, thereby maintaining substantially constant the ratio of amplitude to frequency of the inverter output voltage. As mentioned, the speed at which motor 24 rotates is directly proportional to the inverter frequency. By maintaining a fixed ratio of the amplitude of the inverter output voltage relative to its frequency, overheating of motor 24 will be avoided and the motor will be provided with a constant torque output capability regardless of motor speed.

To adjust the motor speed, the operation of the six SCR's of the phase-controlled rectifier bridge, included in converter 12, may be controlled in well-known manner by controller 13 to establish the d-c bus voltage, across lines 21 and 22, at a selected desired amplitude level to regulate the current flow to inverter 18 and motor 24. For example, a set point or reference voltage, representing the desired d-c bus voltage required to drive the motor at the selected speed, may be provided in controller 25 and this set point voltage may be effectively compared with the actual d-c bus voltage to produce an error or control signal on line 28 which varies as a function of the difference between the desired d-c magnitude (represented by the set point voltage) and the actual magnitude of the d-c bus voltage being fed to the inverter. In a fashion well understood in the art, controller 13 responds to that error signal to produce properly timed gate current pulses for application to the gates of the SCR's in converter 12 in order to control the firing angles as required to establish the d-c bus voltage across lines 21 and 22 at the magnitude necessary to drive motor 24 at the selected speed. If the d-c magnitude tends to vary from the requisite level, the error voltage changes and causes controller 13 to vary the firing angles as necessary to adjust the d-c bus voltage until the correct amplitude level is re-established. Assuming that a different speed is preferred, the set point voltage may be changed (such as by manually adjusting a potentiometer), as a result of which controller 13 causes the bus voltage to change to the level necessary to drive motor 24 at the new desired speed. Of course, while the motor speed may be varied by a manual adjustment, the set point voltage may be derived by sensing some parameter or characteristic of the system, in which the disclosed inverter drive is incorporated, in order to automatically control the motor speed in response to that sensed information.

Turning now to the invention, the d-c bus current (labeled $I_{d\text{-}c\ bus}$ in the drawing) is made up of the d-c current $I_L$ produced at the output of converter 12, which may also be called the filter choke current, and the filter capacitor current $I_c$, such that $I_{d\text{-}c}$ bus equals $I_L + I_c$. The d-c current $I_L$ is made up of the a-c input line currents $I_1$, $I_2$ and $I_3$ rectified by converter 12. By employing a-c current transformers 31, 32 and 33 to sense those a-c line currents, the a-c signals $I'_1$, $I'_2$ and $I'_3$, which will be directly proportional to a-c currents $I_1$, $I_2$ and $I_3$ respectively, will be developed for application to rectifier 35. Rectification of a-c signals $I'_1$, $I'_2$ and $I'_3$ thus develops, at the output of rectifier 35, a d-c current signal $I'_L$ which is directly proportional, and has a waveshape identical, to the d-c current $I_L$ produced at the output of converter 12. Meanwhile, the filter capacitor current $I_c$, which is an a-c current, is sensed by an a-c current transformer 37 to derive an a-c current signal $I'_c$ which is directly proportional, and has a waveshape identical, to the capacitor current $I_c$.

Hence, d-c signal $I'_L$, derived by input current sensing means 31–35, is a reduced amplitude replica of the d-c current $I_L$, namely the filter choke current, while the a-c signal $I'_c$, derived by capacitor current sensing means 37, is a reduced amplitude replica of the filter capacitor current $I_c$. By adding signals $I'_L$ and $I'_c$ in adder 38, a d-c current signal (labeled $I'_{d\text{-}c\ bus}$) is produced which is directly proportional to, and very accurately represents, the d-c bus current $I_{d\text{-}c\ bus}$. Specifically, signal $I'_{d\text{-}c\ bus}$ will be a reduced amplitude replica of, and will have a waveshape identical to, the d-c bus current $I_{d\text{-}c\ bus}$. When the amplitude of the d-c bus current $I_{d\text{-}c\ bus}$ increases, the representative signal $I'_{d\text{-}c\ bus}$ also increases, and when the bus current drops its reduced amplitude version $I'_{d\text{-}c\ bus}$ does likewise.

A d-c bus current representative signal has thus been developed by the monitoring system by using a-c current transformers. Not only is the monitoring system of relatively simple and inexpensive construction, but by employing transformers 31–33 and 37 to couple to the power circuitry supplying power from source 10 to inverter 18 and motor 24, which circuitry will usually be at a relatively high voltage, the low voltage monitoring system will be insulated or isolated electrically from the power circuitry.

The d-c bus current representative signal $I'_{d\text{-}c\ bus}$ may be used for any of the purposes mentioned hereinbefore, or for any of several other purposes which will be readily apparent to those skilled in the art. If desired, the signal $I'_{d\text{-}c\ bus}$ may merely be applied to a meter to provide a visual display of the magnitude of the bus current. In the embodiment illustrated, the signal $I'_{d\text{-}c\ bus}$ is employed to render both the converter 12 and the inverter 18 inoperable or disabled in the event of a fault condition. When a fault occurs, such as when the wrong pair of switching devices in the inverter are inadvertently on at the same time causing a short circuit across the d-c bus 21, 22, or when a short occurs across the output terminals of inverter 18 or in motor 24, the d-c bus current suddenly increases and this increase will be immediately reflected in the bus current representative signal $I'_{d-c\ bus}$. Under normal conditions, the amplitude of signal $I'_{d-c\ bus}$ will be less than that of the reference signal applied to the inverting or negative input of comparator 41 and the output of the comparator will be relatively low or zero. The reference signal represents a predetermined desired maximum level for the bus current and when that level is exceeded during a fault condition signal $I'_{d-c\ bus}$ will be greater than, or positive relative to, the reference signal, causing comparator 41 to produce a relatively high output voltage for application over line 42 to converter controller 13 and inverter controller 25. In response to that voltage, controller 13 turns off all of the SCR's in converter 12 and controller 25 turns off all of the switching devices in inverter 18. The power system will thus be shut down before the high amplitude fault current can cause any damage.

It is apparent that the number of a-c current transformers, required to monitor the a-c input line current, is determined by and is equal to the number of phases of the a-c power line voltage. Since three-phase a-c energy is applied to the input of the a-c to d-c converter in the illustrated embodiment, three a-c current transformers are needed to sense the a-c input current to the converter. A single phase environment therefore necessitates only one a-c current transformer at the input of the converter to provide a signal proportional to the converter output current $I_L$.

While a particular embodiment of the invention has been shown and described, modifications may be made, and it is intended in the appended claims to cover all such modifications as may fall within the true spirit and scope of the invention.

I claim:
1. A monitoring system for monitoring the d-c bus current supplied over a d-c bus to an inverter and received through a low pass filter, having a series-connected filter choke and a shunt-connected filter capacitor, from the output of an a-c to d-c converter, to the input of which converter is applied a-c energy, said monitoring system comprising:
    input current sensing means, including at least one a-c current transformer and a rectifier, for sensing the a-c input current to the converter and deriving a d-c signal which is proportional to the d-c current produced at the output of the converter;
    capacitor current sensing means, including an a-c current transformer, for sensing the filter capacitor current to derive an a-c signal proportional thereto;
    and adding means for adding the two derived signals to produce a d-c signal which is directly proportional to, and very accurately represents, the d-c bus current.
2. A monitoring system according to claim 1 wherein the d-c bus current representative signal, produced by said adding means, is a reduced amplitude replica of the d-c bus current.
3. A monitoring system according to claim 1 wherein the waveshape of the d-c bus current representative signal, produced by said adding means, is substantially identical to the waveshape of the d-c bus current.
4. A monitoring system according to claim 1 wherein the a-c to d-c converter comprises a phase-controlled SCR rectifier bridge.
5. A monitoring system according to claim 1 wherein the a-c energy applied to the a-c to d-c converter is multi-phase, and wherein separate a-c current transformers are included in said input current sensing means to sense the different phases.
6. A monitoring system according to claim 1 wherein three-phase a-c energy is applied to the input of the a-c to d-c converter, and wherein said input current sensing means includes three a-c current transformers to sense respective ones of the three phases, the three output signals of the transformers being rectified to provide the d-c signal which is proportional to the d-c current at the output of the converter.
7. A monitoring system according to claim 1 wherein the filter capacitor is connected in a shunt path across the d-c bus, and wherein the a-c current transformer, included in said capacitor current sensing means, senses the a-c current in the shunt path.
8. A monitoring system according to claim 1 wherein the d-c signal derived by said input current sensing means, the a-c signal derived by said capacitor current sensing means, and the d-c signal produced by said adding means are all isolated electrically, by means of said a-c current transformers, from the circuitry powering the inverter.
9. A monitoring system according to claim 1 wherein the d-c bus current representative signal, produced by said adding means, is employed to render both the converter and the inverter inoperable in the event of a fault condition.
10. A monitoring system according to claim 1 wherein the d-c bus current representative signal, produced by said adding means, is compared with a reference signal to detect any time the d-c bus current exceeds a predetermined desired maximum level.
11. In an inverter system where a-c power line voltage is rectified in a phase-controlled SCR rectifier bridge, after which the rectified line voltage is filtered and smoothed in a low pass filter to develop, across a shunt-connected filter capacitor, an adjustable d-c bus voltage, d-c bus current flowing from the filter to a voltage source inverter, a monitoring system for monitoring the d-c bus current comprising:
    input current sensing means, including a rectifier and a number of a-c current transformers equal to the number of phases of the a-c power line voltage, for sensing the a-c input line current to the controlled rectifier bridge to develop a d-c signal directly proportional to the d-c current produced at the output of the phase-controlled recitifier bridge;
    capacitor current sensing means, including an a-c current transformer, for sensing the filter capacitor current to produce a signal directly proportional thereto;
    and means for combining the signals produced by said input current sensing means and capacitor current sensing means to provide a d-c signal which is directly proportional to, and very accurately represents, the d-c bus current.

* * * * *